Patented Dec. 2, 1930

1,783,695

UNITED STATES PATENT OFFICE

HENRY BLUMENBERG, JR., OF MOAPA, NEVADA

SULPHUR COMPOSITION AND METHOD OF MAKING THE SAME

No Drawing.    Application filed February 14, 1927.  Serial No. 168,234.

My invention consists of a composition of matter which may be used either alone for dusting or spraying plants to destroy insect parasites, moulds or fungi, or may be mixed with other well known suitable agents for any dusting or spraying compositions.

In particular, it is an object of this invention to provide a method whereby sulphur, which is one of the common ingredients in spraying and dusting compositions, may be easily, economically and safely prepared in a finely divided state.

Methods hitherto in use for producing sulphur in a powder form have been by sublimation of the sulphur or by grinding the same. The sublimation method is inefficient as only about a maximum yield of sixty (60%) per cent of flour sulphur is obtained, while the grinding operation is dangerous because the finely divided dust produces with the air a highly explosive mixture, the mixture liable to be ignited by static electricity.

My invention consists in a new method of making a finely divided sulphur associated with boric acid.

Crude sulphur, preferably comminuted, is mixed with 10 per cent of boric acid and subjected to distillation in a suitable retort, such as a cast iron retort. The temperature may vary from say 130 to 300° C. Both the sulphur and boric acid will be sublimated in an intermolecular mixture, very fluffy, forming a yellowish white powder. The proportion of boric acid may be somewhat less than 10 per cent, and may also be increased to approximately 30 per cent of the total mixture. The resulting product may be used either alone or in conjunction with other suitable reagents for spraying and dusting of trees and plants.

The boric acid is a valuable addition to the sulphur, being itself an antiseptic, and is a valuable ingredient to the dusting or spraying composition in which it is used.

Various changes may be made in the steps of the process by those skilled in the art without departing from the spirit of my invention as claimed.

I claim:

1. A method of producing sulphur in a finely divided state comprising mixing sulphur with boric acid and sublimating the same whereby a powdery mixture of sulphur and boric acid is formed.

2. A method of producing sulphur in a finely divided state comprising mixing 90 per cent of sulphur with 10 per cent boric acid and sublimating the same whereby a powdery mixture of sulphur and boric acid is formed.

3. A method of producing sulphur in a finely divided state comprising mixing 90 per cent of sulphur with 10 per cent boric acid and heating the same to a temperature of 130 to 300° C. whereby a powdery mixture of sulphur and boric acid is formed.

4. A composition of matter comprising a powdery mixture of sulphur and boric acid produced by the sublimation of the mixture of sulphur and boric acid.

5. A composition of matter comprising a powdery mixture of 90 per cent of sulphur and 10 per cent boric acid produced by sublimation of the mixture of sulphur and boric acid.

In testimony whereof I have signed my name to this specification.

HENRY BLUMENBERG, JR.